A. KINDSER.
RESILIENT WHEEL.
APPLICATION FILED SEPT. 29, 1920.
1,394,024.
Patented Oct. 18, 1921.
2 SHEETS—SHEET 1.
Fig.-1.
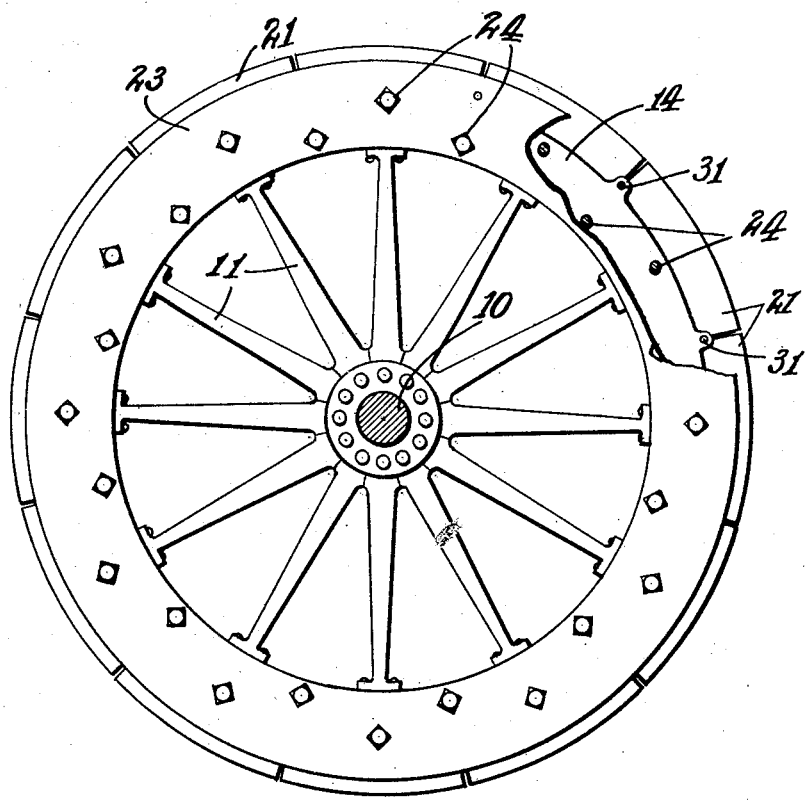
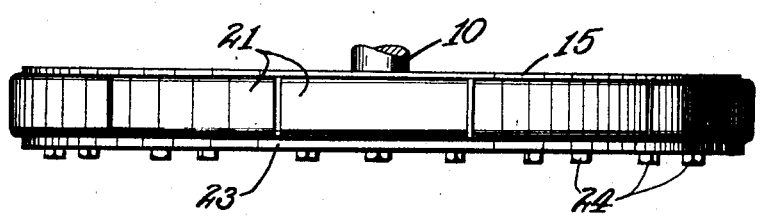
Fig.-2.
INVENTOR
Alexander Kindser
BY
ATTORNEY

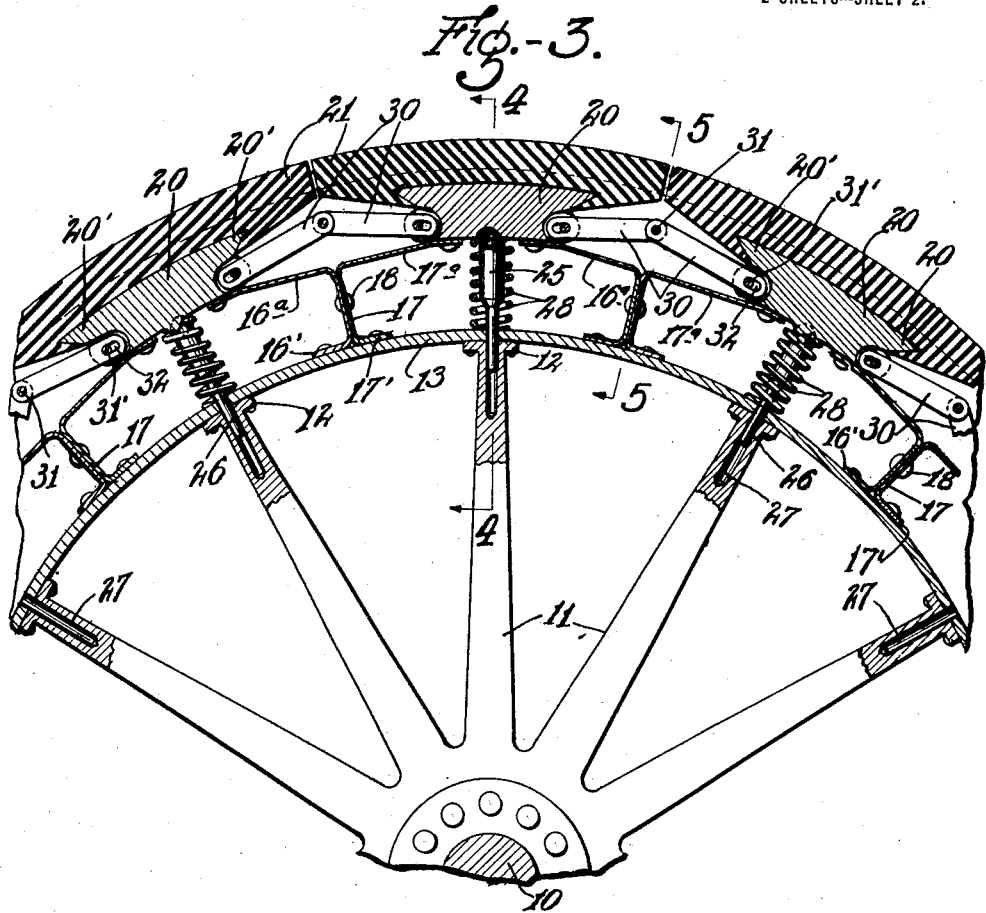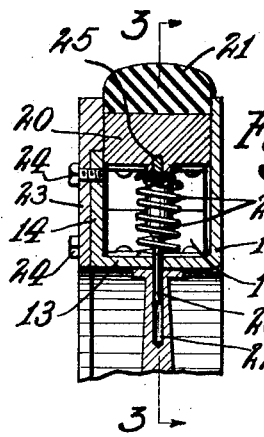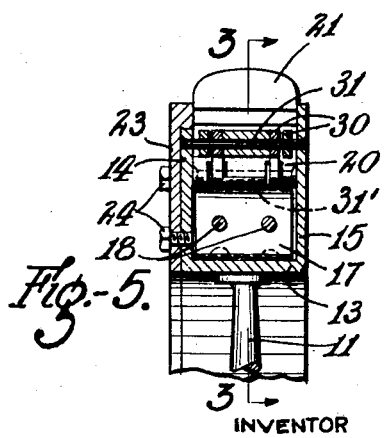

UNITED STATES PATENT OFFICE.

ALEXANDER KINDSER, OF CANON CITY, COLORADO.

RESILIENT WHEEL.

1,394,024.  Specification of Letters Patent.  Patented Oct. 18, 1921.

Application filed September 29, 1920. Serial No. 413,492.

*To all whom it may concern:*

Be it known that I, ALEXANDER KINDSER, citizen of Poland, residing at Canon City, in the county of Fremont and State of Colorado, have invented certain new and useful Improvements in Resilient Wheels, of which the following is a specification.

This invention relates to vehicle wheels, having more particular reference to the resilient construction and mounting of the tread elements thereof, being intended more particularly for application to automobiles, motor trucks, or like vehicles.

The invention has for an object to provide a novel and improved construction for a resilient tread structure which will be simple and inexpensive and will permit of ready replacement of the different parts when desired.

For further comprehension of the invention, and of the objects and advantages thereof, reference will be had to the following description and accompanying drawings, and to the appended claims in which the various novel features of the invention are more particularly set forth.

Figure 1 of the drawings is a face view partly broken away of a vehicle wheel having the invention applied thereto.

Fig. 2 is an edge view thereof.

Fig. 3 is an enlarged fragmentary longitudinal section, this view being taken on the line 3—3 of Fig. 4.

Fig. 4 is a transverse section on the line 4—4 of Fig. 3.

Fig. 5 is a transverse section on the line 5—5 of Fig. 3.

In the drawings 10 indicates the usual hub of an automobile wheel which has the spokes 11 radiating therefrom. The outer ends of these spokes are formed with lateral flanges 12 to which a metallic rim 13 is fastened, by riveting or otherwise.

This rim 13 is formed on opposite sides with the flanges 14 and 15 which project outwardly therefrom, the flange 15 being of somewhat greater height than the flange 14.

Secured to the rim 13, at points midway between the spokes 11 are a series of flat radially extending spring elements 17 arranged in pairs riveted to one another as at 18, these springs having feet 16' and 17' by which they are riveted on the rim 13 and having oppositely extending spring arms 16ᵃ and 17ᵃ at their outer ends.

The outer ends of these arms are riveted or otherwise secured to the opposite ends of a series of blocks 20 located between the flanges 14 and 15 in radial juxtaposition to the spokes 11, the blocks being thus resiliently mounted on the rim 13. Mounted upon these blocks are a series of tread sections 21 of rubber or like resilient material and to provide for the securing of these tread sections on the blocks the ends of the latter are formed with the dovetail-like extensions 20' which fit into the complementary recesses in the tread sections which are inserted sidewise to position and confined against lateral displacement between the flange 15 and a ring-plate 23 secured as by the bolt 24 to the flange 14 beyond which it projects, the outer portion of the ring-plate being thickened to project over the flange 14 and be flush with the inner face thereof, the flange 14 and ring-plate 23 together forming a flange of equal height to the flange 15, the blocks 20 and tread sections 21 being slidably confined between these flanges.

Pivoted to the inner faces of the blocks, in radial alinement with the spokes 11 are studs 25 having diminished extensions 26 which project freely into borings 27 in the ends of the spokes, the rim 13 having registering apertures through which the stud extensions 26 pass, as will be understood. Surrounding the studs 25 are coiled expansion springs 28 which bear between the rim and the blocks 20 and coöperate with the flat spring arms 16ᵃ and 17ᵃ in forming a resilient mounting for the blocks.

The blocks 20 are further guided by, and are limited in their outward movement by, a series of oppositely projecting toggle links 30 which are pivoted on pins 31 extending between the flanges 14 and 15 at points midway between the blocks. These links 30 extend oppositely in pairs from the pins to engage the ends of the blocks 20 to which they are connected by pins 31' carried by the blocks and passing through slots 32 in the ends of the links, the parts being so arranged that the pins 31' engage the inner ends of the slots 32, as the toggle links 30 swing outward with the blocks 20, before these links reach a dead center position, the links thus serving to arrest the outward movement of the blocks.

As will be apparent in my improved vehicle wheel the resiliently mounted tread elements are all linked together, thus insuring greater durability of the parts while providing a construction that is simple and whose various parts may be readily replaced as desired.

Having thus described my invention what I claim as new and desire to protect by Letters Patent of the United States is as follows:

1. In a vehicle wheel, a rim, a series of spring arms arranged in oppositely extending pairs on said rim, and tread elements each secured to one arm of adjacent pairs and toggle link means serving to limit the outward movement of said tread elements.

2. In a vehicle wheel, a rim, a series of spring arms arranged in oppositely extending pairs on said rim, and tread elements each secured to one arm of adjacent pairs, said tread elements having guide pins projecting inwardly therefrom through the said rim, and expansion springs surrounding said guide pins and bearing between said rim and said tread elements.

3. In a vehicle wheel, a rim having outwardly projecting parallel flanges, a series of spring arms arranged in oppositely extending pairs on said rim, a series of blocks slidably confined between said flanges and secured at opposite ends to one arm of adjacent pairs, toggle links pivoted at one end to the flanges of said rim and engaging said blocks at opposite ends to limit the movement of said blocks, and resilient tread sections mounted on said blocks.

4. In a vehicle wheel a series of spokes having borings therein, a rim having outwardly projecting parallel flanges, a series of spring arms arranged in oppositely extending pairs on said rim, a series of blocks slidably confined between said flanges and secured at opposite ends to one arm of adjacent pairs, studs on the inner faces of said blocks engaging in the borings in the said spokes, and coiled expansion springs surrounding said studs.

5. In a vehicle wheel a series of spokes having borings therein, a rim having outwardly projecting parallel flanges, a series of spring arms arranged in oppositely extending pairs on said rim, a series of blocks slidably confined between said flanges and secured at opposite ends to one arm of adjacent pairs, studs on the inner faces of said blocks engaging in the borings in the said spokes, and coiled expansion springs surrounding said studs, and toggle links pivoted at one end to the flanges of said rim and engaging said blocks at opposite ends and serving to limit outward movement of said blocks.

In testimony whereof I have affixed my signature.

ALEXANDER KINDSER.